Oct. 13, 1959 W. G. PERSINGER 2,908,214
BARBECUE GRID

Filed July 29, 1957 2 Sheets-Sheet 1

Wm. G. Persinger,
INVENTOR,

BY O. O. Martin

ATTORNEY

United States Patent Office 2,908,214
Patented Oct. 13, 1959

2,908,214

BARBECUE GRID

William G. Persinger, Burbank, Calif.

Application July 29, 1957, Serial No. 674,645

9 Claims. (Cl. 99—445)

This invention pertains to new and improved barbecue grids.

It can be stated in essentially summary form, that this invention concerns barbecue grids, each of which consists of a series of identically shaped bars spaced equidistant from one another so as to extend parallel to one another. Such bars are formed so that each of them includes a centrally, upwardly curved ridge. The side edges of each of these bars are curled so as to provide gutters below these ridges and each side thereof. Further, with this construction flanges are provided so as to extend downwardly from the ends of the bars, and the edges of the flanges are formed so as to constitute gutters leading to a discharge outlet.

The actual nature of this invention will be more fully apparent from a detailed consideration of the accompanying drawings in which.

Figure 1:
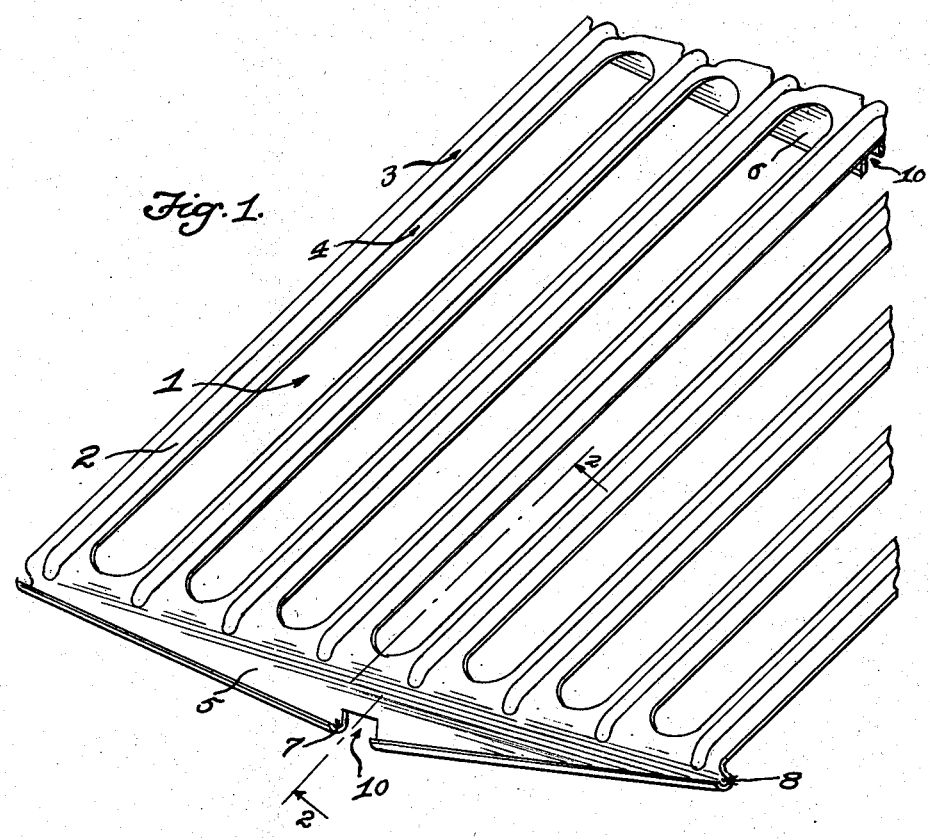
Fig. 1 is a perspective view of a barbecue grid of this invention.
Figure 2:
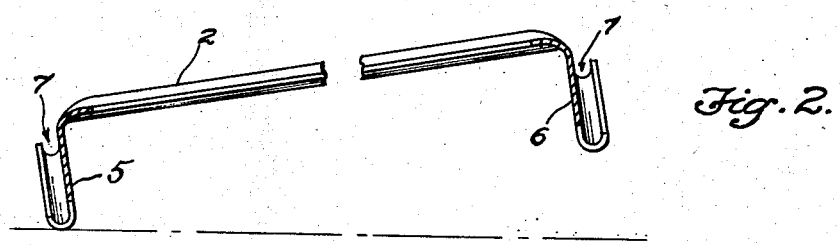
Fig. 2 is a cross-sectional view taken at line 2—2 of Fig. 1.
Figure 3:
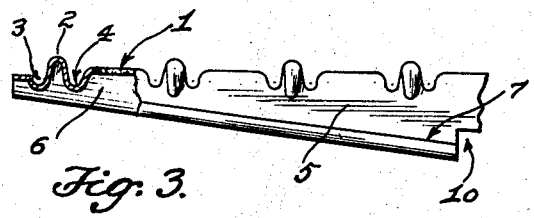
Fig. 3 is a partial end elevational view, partially in section, of the barbecue grid shown in Fig. 1.

The grid of the invention, in the form illustrated in Figs. 1–3 of the drawings, is rectangular in outline and of a size to fit into the particular barbecue or stove frame for which it is designed. The grid is made from a sheet of metal which is shaped to provide a series of identical, equidistantly spaced parallel slots 1. The material between these slots takes the shape of bars the centers of which are bent to form upwardly curved ridges 2, and the side edges of the bars are upwardly curled to provide grooves, or gutters 3, 4 of identical size and shape.

The ends of the grid are identically shaped and they are shown downwardly directed to provide flanges 5, 6, the bottom edges of which are downwardly slanting toward the center of the grid, substantially as indicated in Fig. 1 of the drawings. These edges are also shown upwardly curled to provide gutters 7, 8 which are downwardly directed toward the center of the grid, leaving an open space 10 at the center. These flanges constitute important reinforcing members of the grid.

The grid is in any suitable manner mounted in position in the framing of the barbecue or stove, but as such mounting is commonly made, it is not thought necessary to burden the description with a recital thereof. But it is important to note that the grid must be tilted somewhat toward one end thereof, substantially as indicated in Fig. 2 of the drawings, or in the opposite direction.

The grid, shaped and proportioned substantially as above outlined, is secured in position in the barbecue or stove frame above the burning coals of the barbecue pit. When foodstuff to be cooked is placed thereon, it is found that any grease or fat dripping from the roasting material will land in the gutter 3, 4 of the grid bars. The grease will, when the grid is tilted in the direction shown in Fig. 2, flow down the lower end flange 5 of the grid into the gutters 7, 8 for discharge through the opening 10 at the lower center of the flange.

The width of the grid bars and the proportions of the ridge and gutters are calculated to permit the grease to pass over the end of the grid without overflowing. The ridges 2 should rise a distance above the side edges of the gutters 3, 4 to prevent the foodstuff from settling in the gutters. And the width of the slots should be about equal to the width of the bars. When so proportioned, it is found that the more intense heat rising through the slots will force the grease sidewise into the gutters away from the burning coals.

Figure 4:
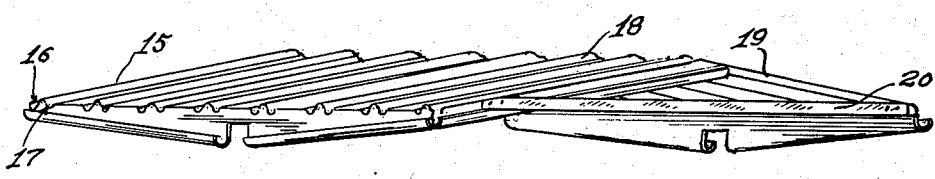
Fig. 4 is a perspective view of a modified barbecue grid of this invention.

It was above pointed out that the grid must be tilted endwise. However, it may be found advantageous somewhat to modify the shape of the grid by elevating the center thereof, substantially as illustrated in Fig. 4 of the drawings.

The general outline and proportions of the bars 15 and bar gutters 16, 17 may remain as above outlined but they are slightly bent at the center to provide the double inclines 18, 19. This modified construction has the advantage that the grid will be placed horizontally in the barbecue frame and also that the flow through the gutters is only one-half the distance. Much smaller gutters can for this reason be employed. It may be found advisable in this construction to place reinforcing bars 20 at both sides of the grid to provide a sturdier grid frame which in this case also may be made from lighter material.

Figure 5:
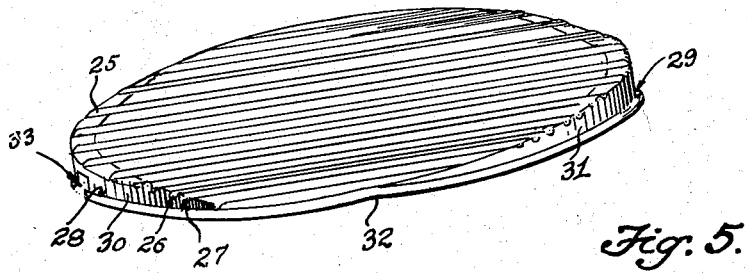
Fig. 5 is a perspective view of a still further modified barbecue grid of this invention.

While the devices above described are rectangular in shape, it is possible and in some cases may be found advantageous to use a circular grid such as illustrated in Fig. 5. The shapes and proportions of the bars 25 and gutters 26, 27 may also in this case remain unchanged but the gutters 28, 29 of the flanges 30, 31 must extend to the center 32 of the grid in order to direct the drippings from all the gutters 26, 27 to the discharge outlets 33. This type of grid must, of course, like the grid of Figs. 1–3 be placed in the barbecue frame in slightly tilted position.

Figure 6:
Fig. 6 is a side elevational view of the barbecue grid shown in Fig. 5.

It is, however, possible to provide a circular grid which may be horizontally installed in the barbecue frame by merely curving the bars upwardly to produce a spherical upper surface 40, substantially as outlined in Fig. 6. The proportions and spacings of the bars 41 and the shape of the flanges 42, 43 may otherwise remain similar to the disclosure of Fig. 5.

I claim:

1. A grid mountable in a barbecue frame, the grid consisting of a series of identically shaped bars equidistantly spaced in parallel relation to each other, the distance between the bars being equal to the width of the bars, each bar including a central upwardly curved ridge, the side edges of the bar being upwardly curled to provide gutters the upper edges of which are a distance below the ridge at each side thereof, flanges extending downwardly from the ends of the bars, the edges of the flanges being downwardly slanting in opposite directions to meet at one point and upwardly curled to form gutters, there being a discharge outlet from the gutters at the meeting point thereof.

2. A device as set forth in claim 1 in which the grid is mounted in position with the bars endwise inclined.

3. A device as set forth in claim 1 in which the grid is rectangular in shape, the flanges at the ends of the bars forming flat grid reinforcing members.

4. A device as set forth in claim 1 in which the bars are bent at the centers thereof to provide two grid surfaces downwardly inclined in opposite directions.

5. A device as set forth in claim 4 in which reinforcing bars interconnect the ends of the grid at both sides thereof.

6. A device as set forth in claim 1 in which the grid is circular in shape.

7. A circular grid mountable in a barbecue frame, the grid consisting of a series of identically shaped bars equidistantly spaced in parallel relation to each other each bar including a central upwardly curved ridge, the side edges of the bars being upwardly curled to provide gutters below the ridge at each side thereof, circular flanges extending downward from the ends of the bars, the edges of the flanges being downwardly slanting in opposite directions and upwardly curled to form gutters, there being a discharge outlet from the gutters at the lower meeting point of the gutters.

8. A device as set forth in claim 7 in which the bars are lengthwise somewhat upwardly curved from the ends thereof to provide a spherical grid surface.

9. A device as set forth in claim 4 in which the grid is circular in shape.

References Cited in the file of this patent
UNITED STATES PATENTS

| | | |
|---|---|---|
| 120,528 | Noble | Oct. 31, 1871 |
| 389,602 | Sankey | Sept. 18, 1888 |
| 640,030 | Rietzke | Dec. 26, 1899 |